United States Patent [19]

Yeh

[11] Patent Number: 4,935,639
[45] Date of Patent: Jun. 19, 1990

[54] REVOLVING POWER TOWER

[76] Inventor: Dong-An Yeh, No. 81, Lane 25, Ching Li St., Tu Cheng Hsiang, Taipei Hsien, Taiwan

[21] Appl. No.: 236,613

[22] Filed: Aug. 23, 1988

[51] Int. Cl.$^5$ .............................................. F03D 3/02
[52] U.S. Cl. ......................................... 290/55; 290/44
[58] Field of Search ................................... 290/44, 55

[56] References Cited

U.S. PATENT DOCUMENTS

| | | | |
|---|---|---|---|
| 4,018,543 | 4/1977 | Carson et al. | 290/55 X |
| 4,070,131 | 1/1978 | Yen | 290/55 X |
| 4,388,533 | 6/1983 | Campbell et al. | 290/55 X |
| 4,433,544 | 2/1984 | Wells et al. | 290/55 X |
| 4,452,046 | 6/1984 | Valentin | 290/55 X |

Primary Examiner—Philip H. Leung
Assistant Examiner—W. E. Duncanson, Jr.
Attorney, Agent, or Firm—Lowe, Price, LeBlanc, Becker & Shur

[57] ABSTRACT

A revolving power tower comprising a fixed tower and a revolving tower, to make use of wind power as main power source and the heat energy of the sun as supplementary power source, said revolving tower being to induce the wind from all directions to run into the present power tower; when the outer heat-absorbing plates and the bottom of the tower being heated by the scorching sun, the inner temperature being to rise; when the wind coming from outside the heat-absorbing plates being to introduce hot air current into the flexible air valve to blow toward the upper-right portion of the non-weight revolving tower to push the blades of the revolving tower to rotate rightward, (at the same time, the bottom air turbine and the electric generator being to start operating) and then, the air current running into the inner portion of the tower, the wind driven by the blades of the air turbine being to circle round and round and to rush out of the tower from the top to form an artificial whirlwind; like natural tornade, the atmospheric pressure in the central portion of the air column being exceptionally low to partly form a vacuum to let the bottom air rush in to make up the deficit and to further rush upward along the central line of the revolving tower, the rushing force resulted from rushing air current being to reinforce the power to make the turbine and the generator to rotate faster and to further increase the generated energy.

6 Claims, 5 Drawing Sheets

REVOLVING POWER TOWER

BACKGROUND OF THE INVENTION

1. Field of the Invention

The present invention relates to a revolving power tower to make use of the principle of a tornado and the wind power as main power source and to make use of the sun as supplementary power source. When the heat-absorbing plates and the bottom of the revolving power tower are heated by the scorching sun, hot air current rises from the bottom and cool air current falls downward; by means of the rushing acceleration of upward air current, the surrounding air immediately runs inward to make up the deficit, therefore, by means of the wind power or the effect of atmospheric pressure, an artificial tornado is thus formed, the power of the tornado is then conducted to drive a turbine wheel generator to generate electricity. The energy of the natural source from wind power and sun heat is valuable, inexhaustible and does not cause any pollution, and therefore, the structure of the present invention is practicable.

2. Description of the Prior Art

Conventional windmill generating set should firstly catch the wind power for further electricity generating process, however, the wind is resulted by nature and it will turns the direction irregularly, if not to think up a method, the wind will be difficult to use. As shown in FIG. 1, when the wind blows on the windmill, the blades are driven to rotate, by means of the force from the rotation of the blades the revolving shaft (7) is forced to push the pump (7) to make a reciprocal movement to such up the water to the reservoir and further to let the water drop to generate electricity. [as shown in FIG. 1, the wind tower comprises a wind-catching fin to let the windmill continuously absorb the wind power; a reservoir for water storage to generate electricity even if the wind power source is stopped to supply; a revolving shaft, a suction pipe, outlet pipe, generator, pump and water]. The heavier the blades of the windmill the greater the resistance and the slower the revolving speed; since the reservoir provides limited water pressure, the generated energy is therefore reduced.

There is theoretically another kind of whirlwind power tower conceived from a group of U.S. scientists of the Gruman Air Space Company (as shown in FIG. 2), their theory is that: when the wind blows through the lateral air valves or fin blades into the tower and circles round and round along the curved inner wall to form a low pressure of artificial tornado, when the circling of the whirlwind reaches to a certain speed the wind moves upward and rushes out of the tower from the top. Similar to natural tornado, the atmospheric pressure of the center portion of the air column is exceptionally low to partly form a vacuum and to let the bottom air rush in to fill the vacuum and to further rush upward along the whirlwind column. The force of the rushing air is then conducted to drive the air turbine to further drive the electric generator. [as shown in FIG. 2, the structure of the wind tower comprises wind, lateral air valves or fin blades, low pressure whirlwind, air turbine, electric generator, drag chain, and the supplementary air]. This whirlwind tower does not revolve, when the outside wind force passes through the lateral fin blades into the tower to circle round and round to form a low atmospheric pressure of whirlwind, the wind comes either from the bottom or the surround to make up the deficit, however, the wind power coming from the bottom to make up the deficit is not stronger than the outside wind force, although it drives the air turbine and the electric generator to work, the electricity generated is limited to a certain range.

SUMMARY OF THE INVENTION

The present invention is to provide a revolving power tower, the main power source comes from wind power, and the supplementary power source comes from the heat energy of the sun. The revolving tower induce the wind from all directions to run into the present power tower, when the outer heat-absorbing plates and the bottom of the tower are heated by the scorching sun, the inner temperature rises, when the wind comes from outside the heat-absorbing plates introduce hot air current into the flexible air valve, and the hot air current blows toward the upper-right portion of the non-weight revolving tower to push the blades of the revolving tower to rotate rightward, (at the same time, the bottom air turbine and the electric generator start to operate) and then, the wind runs into the inner portion of the tower, (since the upper portion is hot and the lower portion is cool, by means of rushing acceleration, the wind circles upward in high speed; the higher the tower the faster the wind speed), the wind driven by the blades of the air turbine circles round and round and rushes out of the tower from the top to form an artificial whirlwind. The atmospheric pressure in the revolving tower is exceptionally low to partly form a vacuum to let the bottom air rush in to make up the deficit and to further rush upward along the central line of the revolving tower. This rushing force reinforces the power to make the turbine and the generator to rotate faster and to further increase the generated energy.

Although the sun provides a supplementary power, the heating of the sun is not sufficient. We can arrange one or more small wind compression towers on the roof of the present revolving tower, through the theory of air conditioner, to compress the freon of the compressor to push the air flow through air pipe to the bottom freon radiator and to further let the radiator exhaust hot air, the air current further flows through air pipe to the top freon evaporator to produce cooling air and to further return to the compressor, therefore, due to great variation in temperature between the upper portion and the lower portion of the inner space of the present revolving power tower, a strong air current rushes upward to drive the turbine and the generator to rotate.

DETAILED DESCRIPTION OF THE PREFERRED EMBODIMENTS

Figure 1:
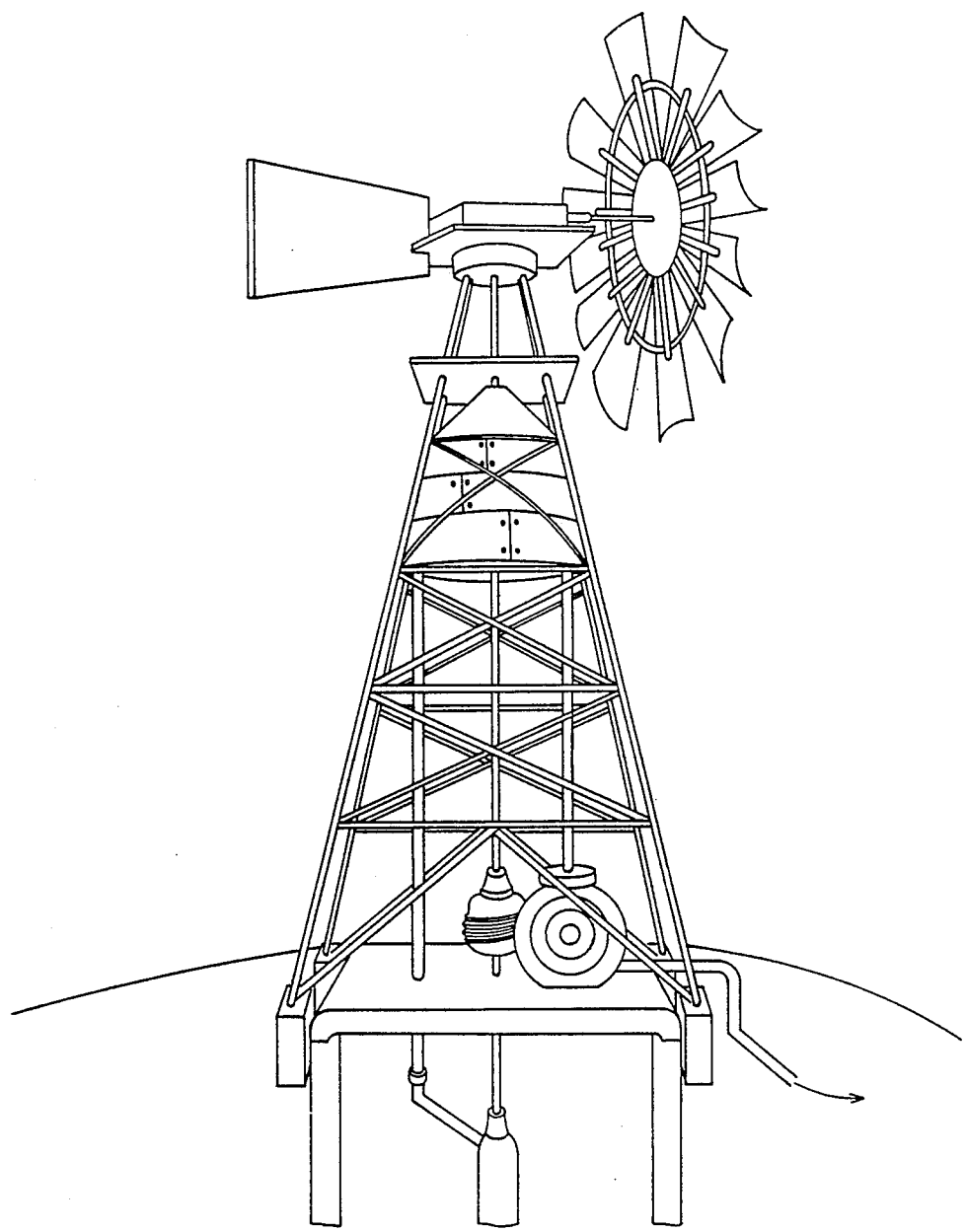
FIG. 1 is a perspective view of a conventional revolving power tower.
Figure 2:
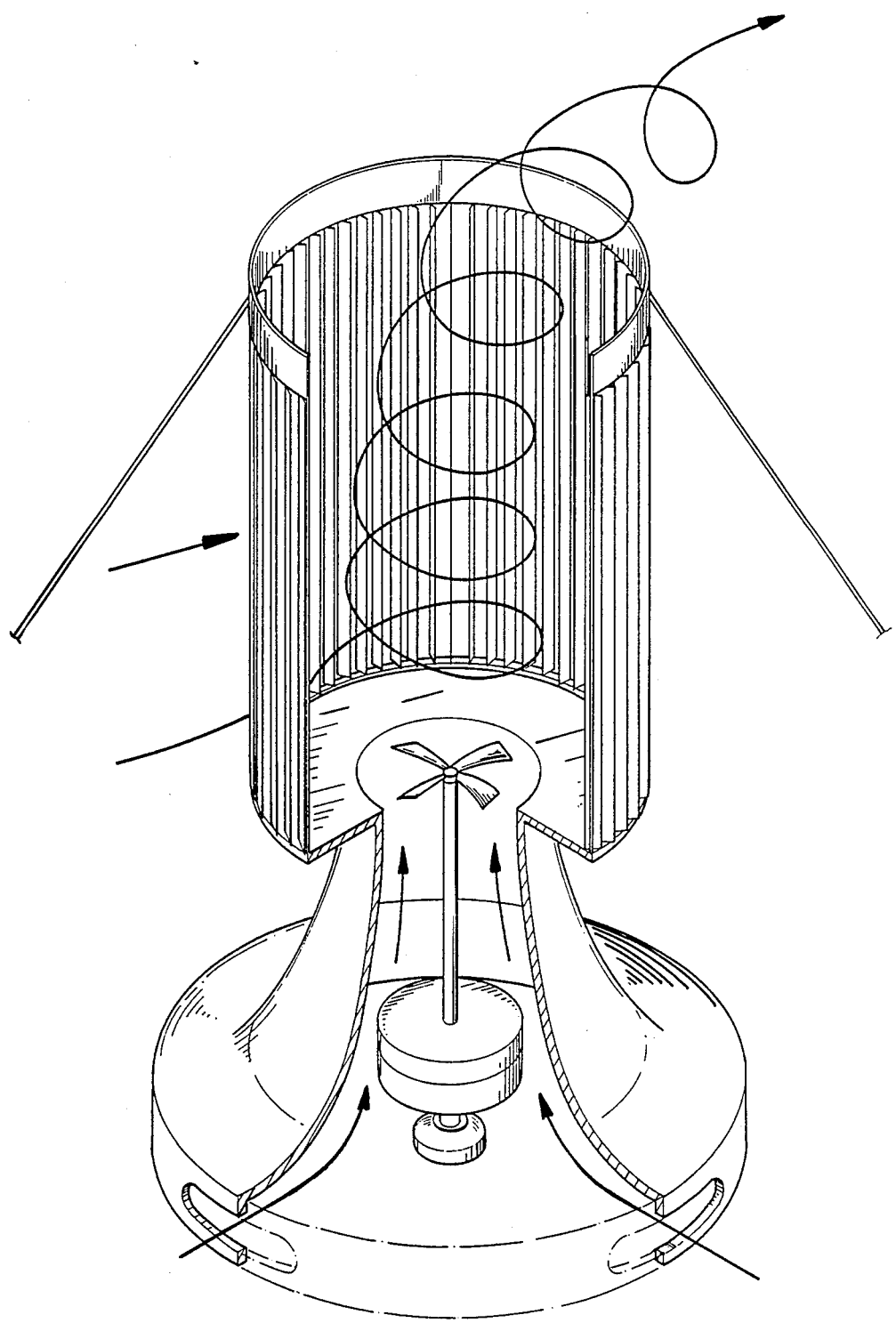
FIG. 2 is a perspective sectional view of a conventional whirlwind tower.
Figure 3A:
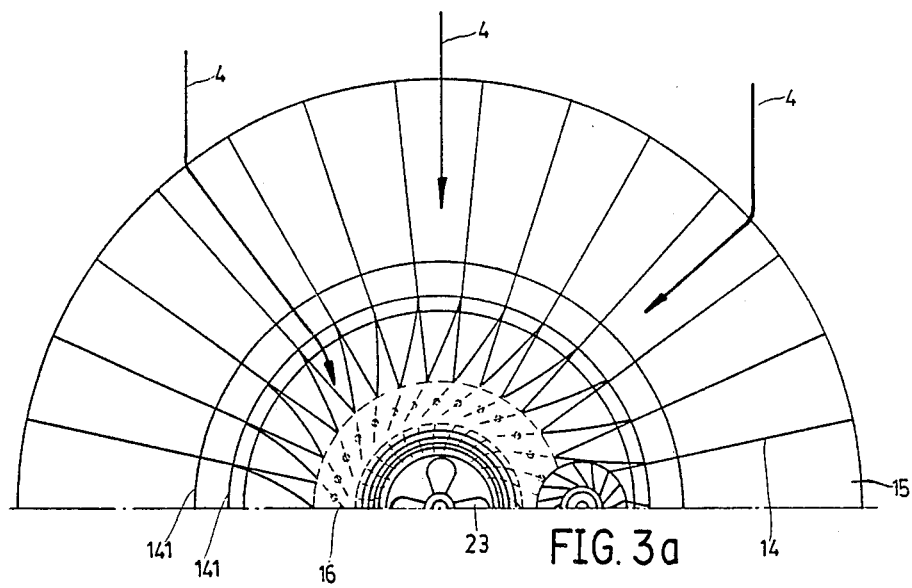
FIG. 3 is a cross-sectional plain view of a revolving power tower embodying the present invention.
Figure 3B:
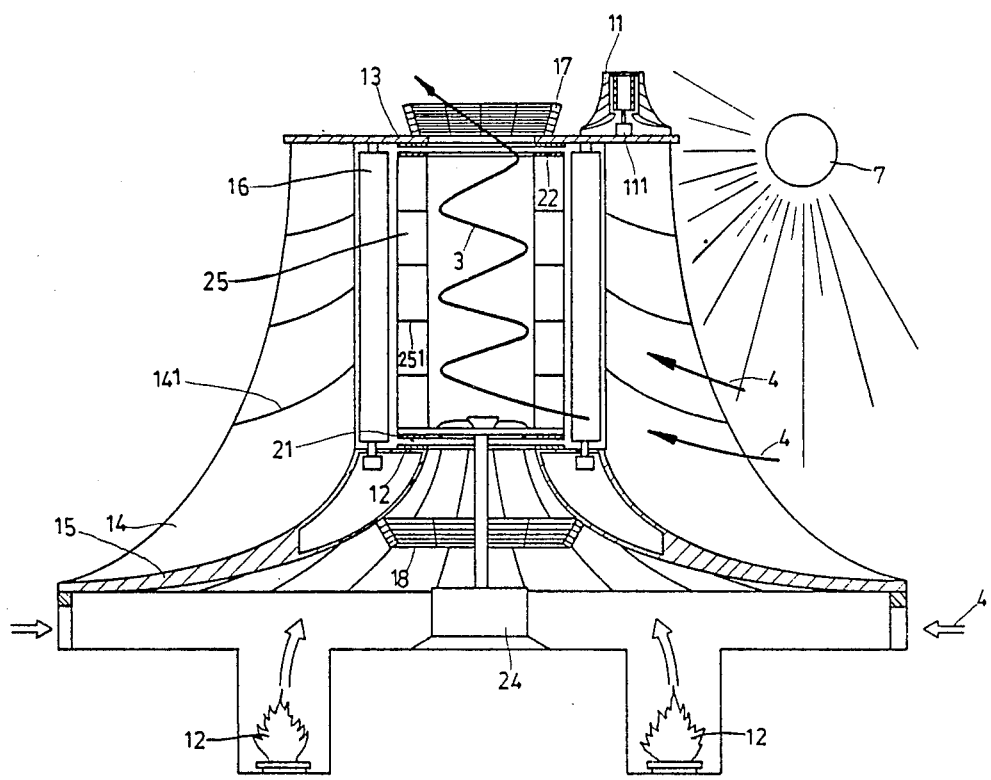
Figure 4:
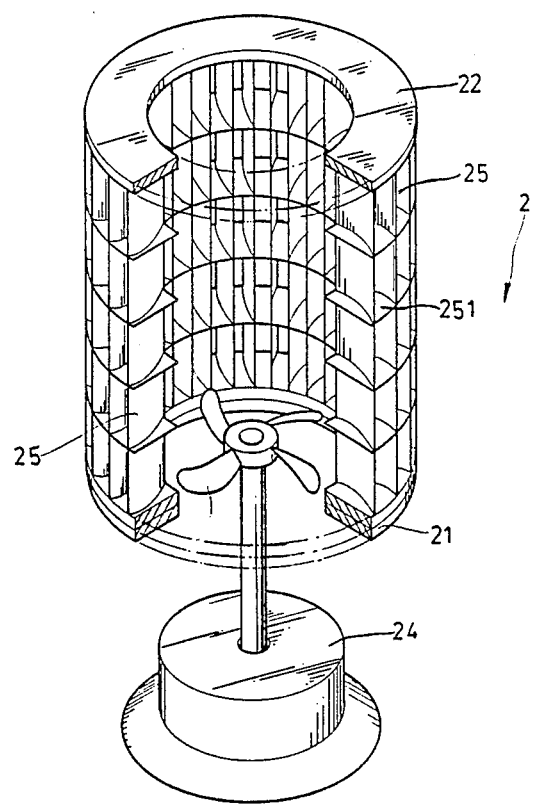
FIG. 4 is a perspective view of the preferred embodiment according to the present invention.
Figure 5:
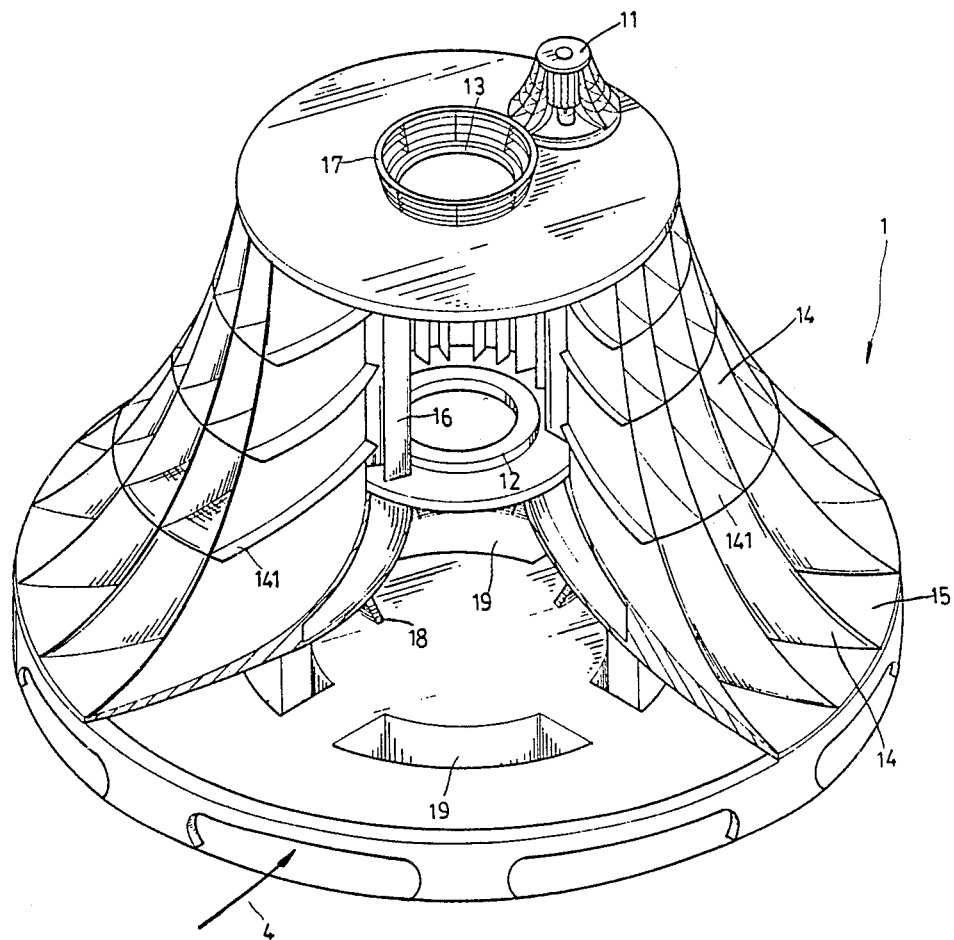
FIG. 5 is a perspective view of the fixed tower of the present invention.

Referring to FIGS. 1, 2, and 3, the revolving power tower according to the present invention comprises a fixed tower (1) and a revolving tower (2). The fixed tower (1) is provided with a small wind force compression tower (11); said compression tower (11) is non-weight type, making use of the property of the magnet that some magnetic poles repel each other, different magnetic poles attract mutually; the magnet (12) in the fixed tower (1) is arranged with S pole upward and N pole downward while the magnet (21) in the revolving tower (2) is arranged with the S pole downward and the N pole upward, therefore, said two magnets repel each other, this force controls the eccentricity and the balance of the revolving tower (2) letting the weight of the revolving tower (2) be shifted to the upper fixed tower (1), and the turbine (23) and the generator (24) of the revolving tower (2) are reduced in weight to become in a non-weight status; the arrangement of the magnets can be made with magnetic blocks. If the height of the fixedly guided heat-absorbing plates (14) of the fixed tower (1) is over a certain range, few more layers of fixedly guided heat-absorbing plates (141) can be arranged between the bottom (15) and the top. Said fixedly guided heat-absorbing plate (14) comprises a steam valve (16) thereinside. Said revolving tower (2) comprises lateral blades (25) arranged between the magnets (21) and (22) inside the flexible steam valve (16) of the fixed tower (1), the outer atmospheric pressure outside the blades (25) is stronger than the inner atmospheric pressure, when the height of the blades (25) is over a certain range, few more layers of transverse blades (251) can be arranged among the blades (25). Said revolving tower (2) also comprises a turbine (23) and an electric generator (24). Said fixed tower (1) comprises a freon evaporator (17) at the top and a freon radiator (18) below the bottom (15), and a plurality of heaters (12) at the bottom to heat hot air current letting hot air current rise at a rush through the hole (19). The low pressure air current (3) in the central portion at the bottom of the revolving tower (2) are gathered from the wind (4) in all directions.

The main power source applied in the present revolving power tower comes from wind power, and the supplementary power comes from the heat energy of the sun. The revolving tower (2) invites the wind (4) from all directions, when the outer fixedly guided heat-absorbing plates (14) and the bottom (15) of the fixed tower (1) are heated by the scorching sun (7), the temperature rises, and when the wind (4) runs into the tower from outside the heat-absorbing plates (14) guide the hot air current to run into the flexible steam valve (16) to blow over the upper-right portion of the inner and non-weight revolving tower (2) and to push the blades (25) of the revolving tower (2) letting the revolving tower (2) to rotate rightward (at the same time, the bottom air turbine and the electric generator start to operate) and then, the wind runs into the inner portion of the revolving tower (2), (since the upper portion is hot and the lower portion is cool, by means of rushing acceleration, the wind circles upward in high speed; the higher the tower the faster the wind speed), the wind driven by the blades of the air turbine (23) circles round and round and rushes out of the tower from the top to form an artificial whirlwind. The atmospheric pressure in the revolving tower (2) is exceptionally low to partly form a vacuum to let the bottom air rush in to make up the deficit and to further rush upward along the central line of the revolving tower (2). This rushing force reinforces the power to make the turbine (23) and the revolving tower (2) and the generator (24) to rotate faster and to further increase the generated energy.

Under non-weight status, the revolving tower (2) revolves more faster, the reduced eccentric force permits the revolving tower (2) to keep in good balance during revolving, further, the smaller the eccentric force the faster the speed of the wind to rush upward and the better the stability of the revolving tower (2).

The revolving tower (2), according to the present invention, comprises a plurality of heaters (12) at the bottom, which consumes the fuel of coal or oil . . . etc. to produce hot air current as supplementary power source.

According to the present invention, the revolving tower (2) is arranged with a plurality of small wind-rotated compression tower (11) at the top, by means of the theory of air conditioner, the compressor (111) in each compression tower (11) compresses the freon through air pipe toward the bottom freon radiator (18) to exhaust the hot air, then, through air pipe to the top freon evaporator (17), cooling air current is produced and guided to the compressor (111); by means of this arrangement, a great temperature difference between the bottom and the top of the revolving tower is thus formed to cause an air current fast rush upward to drive the turbine (23) and the generator (24) to rotate and to increase generated energy.

The magnets (13) (22) (21) (12) used in the revolving power tower according to the present invention, can either by in a circular or a block shape; in case magnetic blocks are used, the number of the magnetic blocks (22) (12) should be one piece more than the magnetic blocks (13) (21).

The flexible steam valve (16) according to the present invention, can automatically adjust its angle according to the wind (4) available so as to guide in the wind (4) from all directions.

The speed governing motor (191) according to the present invention, can adjust the direction of the flexible steam valve (16) during typhoon season to reduce the inlet volume of the wind so as to protect the component parts from damage due to excessively fast revolving of the tower.

The difference between the present revolving power tower and the conventional whirlwind tower is that the present revolving power tower will rotate and the whirlwind tower does not rotate; the present revolving power tower includes an outer fixed tower and an inner revolving tower. The turbine and the generator in the conventional whirlwind power tower are incorporated into one unit, the heavier the power machinery set the greater the resisting force and the smaller the generated energy; in the revolving power tower according to the present invention, the inner revolving tower and the turbine and the generator are all incorporated into one unit, the machinery set is arranged in a non-weight status, due to reduced weight or non-weight, the resisting force is minimized and therefore, the generated energy can be maximized.

The fast bullet trains in Japan and West Germany are to adopt the theoury that the same magnetic poles of the electro magnets expel each other and the different magnetic poles attract mutually; therefore, the weight of the train is minimized or the train becomes in a non-weight status, and the train can run in an exceptionally fast speed like bullet. However, the electro magnet consumes a lot of electricity while magnetic iron does not require any electric power.

In addition to electric power generating purpose, the revolving power tower according to the present invention is also applicable for the following purposes:

(1) If the generator is replaced by a water pump, the revolving tower becomes a water tower for hydraulic power generation. When the water falls downward from an upper water pool through a turbo-generator to a lower water pool, the revolving water power according to the present invention sucks up the water from the lower water pool to the upper water pool to keep the water of the upper water pool be always in high level, therefore, the hydraulic power generator can continuously operate. Furthermore, a small scale revolving water tower can be used to irrigate terraced paddies.

(2) The revolving power tower can be equipped with search-light at the top to become a light house for installation at seashore or small island.

(3) The revolving power tower can be equipped with a compressor to replace the generator so as to become a wind-power-driving compression tower to make use of the theory of air conditioner for heating or cooling process.

(4) The revolving power tower can be arranged at a ship to drive propeller.

(5) Small scale of revolving power tower can be arranged at the top of a car for car battery recharge or power supply.

Taiwan in located at an area within insular climate. The Institute of Energy and Mining of the I.D.R.I. had made an survey over the whole island of Taiwan through 17 simple meteorological station, and the survey report indicated that in Taiwan area there was at least a wind power of million KW/hr available. This potential equals to the generated energy of a nuclear generator set and is worthy of cultivation.

In general, the revolving power tower according to the present invention provides the following advantages:

(1) Wind power and heat energy of the sun are inexhaustible natural resources and does not cause any pollution.

(2) The revolving power tower according to the present invention can make use of the wind comes from all directions.

(3) The area of the fixedly guided heat-absorbing plates of the outer tower which absorbs wind power is over two times of the inner revolving tower, therefore, the wind power is imperceptibly doubled for application.

(4) The inner revolving tower and its turbine and generator are minimized in weight or in non-weight status, therefore the resisting force is minimized, the revolving speed is accelerated and the generating energy is maximized.

(5) The revolving tower provides high revolving speed, low eccentric force, and high stability, such that the air current rushes upward very fast.

(6) The wind power is guided by means of the effect of the fixedly guided heat-absorbing plates to constantly blow toward the upper right portion, i.e. to the most efficient direction to drive the revolving tower.

(7) The wind power-driving compressor at the top of the tower is to make use of the theory of air conditioner to heat the bottom to increase the temperature difference between the bottom and the top inside the tower so as to further produce an upward and severe rushing air current.

I claim:

1. A power tower comprising a fixed tower having an exit port in the upper portion and having air inlets around the lower circumference thereof; a revolving tower rotatably mounted in the upper portion of said fixed tower, said revolving tower having upstanding walls of inwardly and upwardly directed blades; a flexible valve means surrounding the revolving tower for directing incoming air from the fixed tower inlets upwardly and tangentially against the blades to cause said tower to rotate; heat absorbing plates surrounding the lower portion of the fixed tower at the air inlets; a turbine and generator means disposed in the bottom portion of said fixed tower below the revolving tower for rotating to produce electricity responsive to incoming heated air currents whereby rotation of said tower will cause an upward spirally movement of air creating a partial vacuum within said tower drawing in outside air to drive said turbine and generator means.

2. The tower of claim 1 wherein the heat absorbing plates are oriented at the inlets to direct incoming air upwardly in a spirally movement toward the interior of said tower.

3. The tower of claim 1 further comprising a wind driven compressor at the exit port in said tower and a radiator in the lower portion and refrigerant circulating means whereby a refrigerant takes on heat at the compressor and gives off heat at the radiator.

4. The tower of claim 1 further comprising control means at said valve means for controlling the speed of rotation of said tower and turbine and generator means.

5. The tower of claim 11 further comprising magnet means disposed above and below said revolving tower for minimizing the weight thereof.

6. The tower of claim 1 wherein the magnetic means includes mutually spaced pairs of magnets mounted respectively on the bottom of the revolving tower and lower portion of the fixed tower and the upper portions of the revolving and fixed towers said lower magnet pairs repelling each other and said upper magnet pairs attracting each other.

* * * * *